United States Patent [19]

Scheffel

[11] 4,311,296

[45] Jan. 19, 1982

[54] CARTRIDGE ELEMENT CONTROL

[76] Inventor: Gerd Scheffel, 4052 Korschenbroich 1, Fed. Rep. of Germany

[21] Appl. No.: 66,392

[22] Filed: Aug. 14, 1979

[30] Foreign Application Priority Data

Aug. 16, 1978 [DE] Fed. Rep. of Germany ....... 2835771

[51] Int. Cl.³ ..................... F16K 31/02; F16K 31/122

[52] U.S. Cl. ........................................ 251/29; 91/459; 91/461; 251/30; 251/38; 318/607

[58] Field of Search ............... 251/30, 38, 29; 91/459, 91/461; 318/604, 607

[56] References Cited

U.S. PATENT DOCUMENTS

| | | | |
|---|---|---|---|
| 910,092 | 1/1909 | Simonds | 251/30 |
| 1,767,037 | 6/1930 | Anderson | 251/29 |
| 2,084,030 | 6/1937 | Hoppe | 251/30 |
| 2,439,523 | 4/1948 | Miller et al. | 251/30 |
| 2,528,512 | 11/1950 | Greenough | 318/607 |
| 2,544,921 | 3/1951 | Greenough | 318/607 |
| 2,668,556 | 2/1954 | Meyer | 251/29 |
| 2,812,774 | 11/1957 | Anderson et al. | 251/30 |
| 2,914,079 | 11/1959 | Hertrich | 251/29 |
| 3,005,135 | 10/1961 | Palmer et al. | 318/607 |
| 3,050,034 | 8/1962 | Benton | 251/30 |
| 3,059,663 | 10/1962 | Whitenack | 251/30 |
| 3,158,174 | 11/1964 | Stalnecker et al. | 251/29 |
| 3,209,220 | 9/1965 | Joy | 318/607 |
| 3,221,609 | 12/1965 | Frantz | 251/30 |
| 3,390,694 | 7/1968 | Rouvalis | 251/30 |
| 3,483,362 | 12/1969 | Feldmann et al. | 318/604 |
| 3,529,420 | 9/1970 | Guyot | 251/29 |
| 3,576,292 | 4/1971 | Block | 251/30 |
| 3,906,324 | 9/1975 | Smith | 318/604 |
| 3,906,991 | 9/1975 | Häussler | 251/38 |
| 3,981,478 | 9/1976 | Lundsgart | 251/29 |
| 4,007,906 | 2/1977 | Karpenko | 251/30 |
| 4,024,884 | 5/1977 | Prescott et al. | 251/38 |

FOREIGN PATENT DOCUMENTS

| | | | |
|---|---|---|---|
| 868507 | 2/1953 | Fed. Rep. of Germany | 251/30 |

*Primary Examiner*—Martin P. Schwadron
*Assistant Examiner*—G. L. Walton

[57] ABSTRACT

A system for regulating the flow of a fluid in dependence of an input signal includes a valve housing, a valve between an inlet and an outlet of the valve housing, a cylinder substantially closed off from the cartridge valve housing, and a piston in driving connection with the valve, and movable within the cylinder in opposite directions. A resilient device urges the piston to drive the cartridge valves so as to close the outlet , and a fluid control device communicates with a main fluid conduit and with first and second openings of the cylinder disposed on respective opposite sides of the piston. The valve housing inlet and a source of fluid are connected to the first and second openings of the cylinder, respectively, in a first active station of the fluid switch, but this connection is reversed in a second active station thereof; the first and second openings, and the source of fluid are blocked in a neutral station of the fluid switch. A magnetic device controlled by the input signal exerts a force on the switch, and a system for transmitting any pressure difference to the switch existing between first and second fluid pressures on respective opposite sides of the piston opposes the force of the magnetic device.

9 Claims, 3 Drawing Figures

Fig. 1
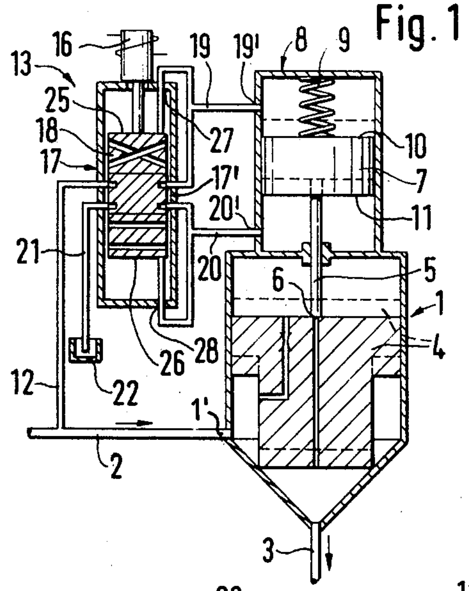
Fig. 2
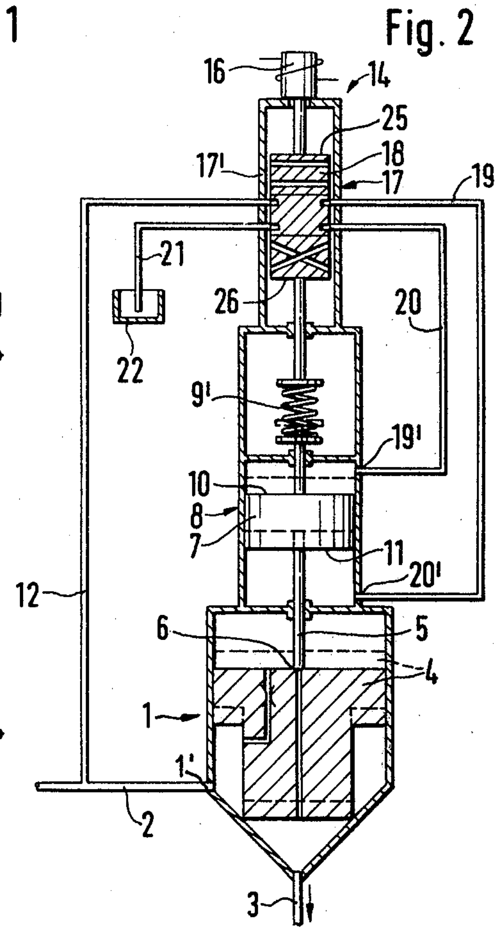
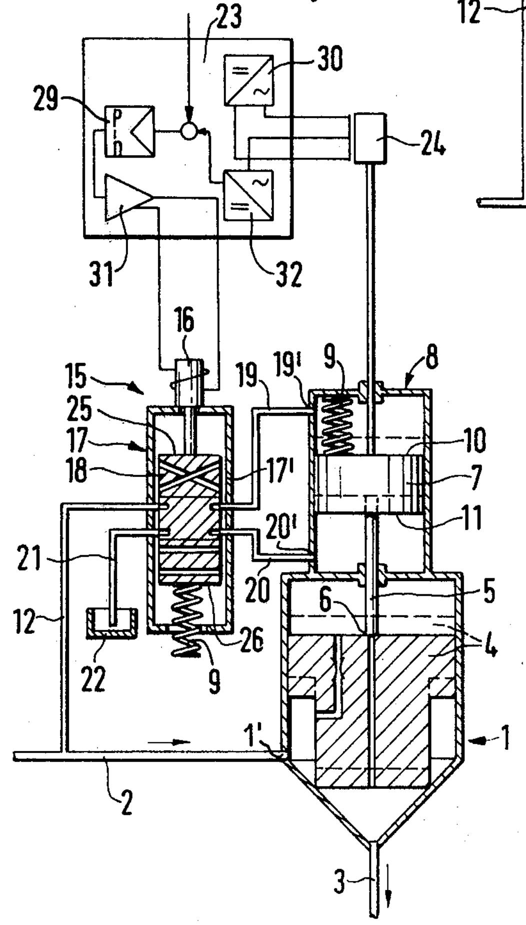
Fig. 3

CARTRIDGE ELEMENT CONTROL

BACKGROUND OF THE INVENTION

The invention relates to a mechanism for controlling a cartridge element for the purpose of controlling the flow of a fluid, for example by the use of a throttle.

In valves used for regulating paths by means of control sliders, it is known that the proportionality between a displacement of the slider, and an input signal can be obtained, by making the position of the slider dependent on an equilibrium of forces acting thereon; that means that the displacement of the slider is changed, by a change of the ratio of forces acting thereon, as the position of the slider must, according to the basic laws of physics, adjust itself, so that the forces acting thereon are in equilibrium.

By this means a precise and finely regulated position of a driven member is possible, which is, for example required in various transport machines and other devices. Using a cartridge valve, that means a valve having two inlets, but only a single control chamber, or a steering edge it has been very difficult up till now to devise a direct relation between an input signal and a dimensionally controllable cross-section for the flow of the fluid through the cartridge valve.

In contrast to slidable valves, cartridge valves have only a single input, or conduit for oil, so that it is necessary to borrow processes already established from the displacement slider technique and apply it to the cartridge technique, namely a combination of two main flow conduits and its associated piston or ring surface, with the required second conduit for oil.

By this combination the corresponding surface is exposed to any fluctuations of pressure occurring in the main conduit, which in turn requires that these fluctuations must be appropriately regulated on an oppositely diposed conduit for oil, so as to displace or position the cartridge piston to the desired position.

This type of control system makes very high demands on the quality of the regulating system.

SUMMARY OF THE INVENTION

It is an object of the present invention to displace a cartridge valve using simple means by a predetermined amount, so as to make available a cross-section of prearranged dimensions, for the flow of the fluid, which is proportional to the input signal; a technique of this type is already known for control of a displacement slider.

This object is attained, according to the present invention, by a system for regulating the flow of a fluid in dependence of an input signal, which includes a cartridge valve housing having an inlet for receiving a fluid from a main conduit, and an outlet for discharging the fluid, cartridge valve means between the inlet and the outlet so as to control the flow of the fluid discharged from the outlet, a cylinder substantially closed off from the cartridge valve housing, a piston in driving connection with the valve means and being movable within the cylinder in opposite cartridge valve closing and cartridge valve opening directions, the cylinder having a first opening disposed on one side of the piston, and a second opening disposed on the other side of the piston for fluid to pass therethrough, the fluid on the one side of the piston exerting a first pressure on the one side, the fluid on the other side of the piston exerting a second pressure on the other side, resilient means urging the piston to close the cartridge valve means for throttling the flow of fluid from the cartridge valve housing inlet to the cartridge valve housing outlet, fluid control means in communication with the main conduit and with the first and second openings of the cylinder including a fluid switch having first and second active stations, and a neutral station, the fluid switch, when operative, occupying one of the active stations, the main conduit being connected to the first opening of the cylinder, the second opening of the cylinder being connected to a source of fluid in the first active station, the main conduit being connected to the second opening of the cylinder, the first opening being connected to the source of fluid in the second active station, fluid transmission to the first and second openings being blocked in the neutral station, and magnetic means controlled by the input signal for exerting a force on the fluid switch in dependence of the input signal, and means for transmitting any pressure differential between the first and second fluid pressures to the fluid switch so as to oppose the force of the magnetic means, whereby the fluid switch is changed from at least one of the active stations to the neutral station upon the first pressure equalling the second pressure.

In one version of the invention the fluid switch includes a container, and a slider reciprocally slidable in the container along a predetermined direction, and along a direction opposite to the predetermined direction, the slider having oppositely disposed end surfaces substantially at right angles with the directions, the container having first and second apertures disposed substantially opposite the end surfaces, respectively, and wherein the means for transmitting any pressure difference between the first and second fluid pressures to the fluid switch includes a first conduit communicating with the first cylinder opening and the first aperture, and a second conduit communicating with the second cylinder opening and the second aperture.

In a second version of the invention the fluid switch includes a container, and a slider reciprocally slidable in the container along a predetermined direction, and along a direction opposite to the predetermined direction, the magnetic means exerting a force on the slider, and wherein the means for transmitting any pressure difference between the first and second fluid pressures to the fluid switch includes the resilient means, the resilient means being connected to the slider so as to exert a force thereon opposite to the force of the magnetic means, whereby a comparison of the forces exerted on the slider by the magnetic means and the resilient means takes place in the fluid switch.

It is advantageous if the resilient means is at least partially disposed in the cylinder.

In a third version of the invention the means for transmitting any pressure difference between the first and second fluid pressures to the fluid change-over switch includes position measuring means for measuring an actual position of the piston within the cylinder, comparator means for comparing a desired position of the piston with the actual position, and drive means connected to the comparator means for positioning the magnetic means in dependence of the input signal, whereby the piston assumes a steady-state position proportional to the input signal.

It is advantageous if the position measuring means includes an oscillator, and if the position measuring means measures the actual position of the piston within the cylinder in a contactless manner.

It is further advantageous if the position measuring means provides an indicating signal in the form of an alternating current signal indicative of the position of the piston, and if rectifying means are provided for rectifying the alternating current signal, and for feeding the rectified signal to the comparator means. The comparator means advantageously includes an amplifier in the form of an integrated circuit.

BRIEF DESCRIPTION OF THE DRAWING

For a fuller understanding of the nature and objects of the invention, reference should be had to the following detailed description, taken in connection with the accompanying drawing in which:

FIG. 1 shows a mechanism for precontrol according to a process reduction;

FIG. 2 shows a mechanism with a mechanical follow-on system, and

FIG. 3 shows a mechanism with an electrical position control.

DESCRIPTION OF THE PREFERRED EMBODIMENTS

Referring now to the drawing, a cartridge valve housing 1 has an inlet 1' for receiving a fluid from a main conduit 2, and an outlet 3 for discharging the fluid. A valve or cartridge element 4 disposed between the inlet 1', and the outlet 3, so as to control the flow of fluid discharged from the outlet 3, communicates hydraulically through linkage means 5 with an adjustable throttle 6 of a piston 7. The throttle 6 is formed by pressing the flat end of the linkage 5 on the bore in the center of the cartridge-element 4 and this has an opening-closing function and is by this means controlling the flow. The piston 7 is disposed in a cylinder 8 substantialy closed off from the valve housing 1; the piston 7 is in driving connection with the valve or cartridge element 4, and may be moved within the cylinder 8 in opposite directions, so as to cause the valve or cartridge element 4 to open or close the discharge opening 3.

The cylinder 8 has an opening 19' disposed on one side of the piston 7, and an opening 20' disposed on the other side of the piston 7, for fluid to pass therethrough. The fluid on one side of the piston 7 exerts a first pressure on the one side, and the fluid on the other side of the piston 7 exerts a second pressure on the other side.

Resilient means in the form of a spring 9, or 9' urges the piston 7 to close the valve or cartridge element 4 for throttling the flow of fluid from the cartridge valve housing inlet 1' to the valve housing outlet 3.

A fluid control device communicates with the main conduit 2, and with the openings 19' and 20' of the cylinder 8. The fluid control device includes a switch 17, which has first and second active stations, and a neutral station. The fluid switch 17 occupies one of the active stations, when operative.

The cartridge valve housing inlet 1' is connected to the opening 19' of the cylinder 8, and the opening 20' of the cylinder 8 is connected to a source of the fluid in the first station; the cartridge valve housing inlet 1' is connected to the opening 20' of the cylinder 8, and the opening 19' is connected to the source of fluid in the second active station. The openings 19' and 20' and the source of fluid are blocked in the neutral station.

The magnet 16 controlled by the input signal exerts a force on the fluid switch 17 in dependence of the input signal, and means are provided for transmitting any pressure difference between the first and second fluid pressure to the fluid switch 17, so as to oppose the force of the magnet 16; this causes the fluid switch 17 to be changed from at least one of the active stations to the neutral station, when the first pressure equals the second pressure.

In a first version of the invention, the fluid switch 17 includes a container 17' and a slider 18, which slider 18 slides reciprocally in the container 17' along a predetermined direction, and along a direction opposite to the predetermined direction. The slider 18 has oppositely disposed end surfaces 25 and 26 substantially at the ring angles with the above-described direction; the container 17' also has an aperture 27, and an aperture 28 disposed substantially opposite the end surfaces 25 and 26, respectively. The magnet 16 will then be seen to exert a force directly on the slider 18.

The means for transmitting any pressure difference between the first and second fluid pressures to the fluid switch 17 in this version of the invention includes a conduit 19 which communicates with the first cylinder opening 19' and the aperture 27, and a second conduit 20 which communicates with the second cylinder opening 20', and the second aperture 28.

In a second version of the invention the magnet 16 exerts a force directly on the slider 18, and the means for transmitting any pressure difference between the first and second fluid pressures to the fluid switch 17 includes the resilient means 9' in the form of a spring. The spring 9' is also connected to the slider 18 so as to exert a force thereon opposite to the force of the magnet 16, so that a comparison of the forces exerted on the slider 18 by the magnet 16, and the spring 9', takes place in the fluid switch 17.

The fluid switch 17 and the cylinder 8 are firmly mechanically connected together. The spring 9' is acted upon by a compression load exerted between the piston 7 and the slider 18.

In a third version of the present invention the means for transmitting any pressure difference between the first and second fluid pressure to the fluid switch 17 includes position measuring means 24 for measuring an actual position of the piston 7 within the cylinder 8, comparator means 23 for comparing a desired position of the piston 7 with the actual position, and drive means 29 connected to the comparator means 23 and connected to the rectifier means 31 for positioning the magnet 17 in dependence of the input signal, so that the piston 7 assumes a steady-state position proportional to the input signal. The position measuring means may be a displacement pick-up 24 including an oscillator 30, so that the actual position of the piston 7 within the cylinder 8 is measured in a contactless manner. The displacement pick-up 24 is arranged to provide an indicating signal in the form of an alternating current signal, which is indicative of the position of the piston 7; a demodulator 32 is provided for feeding the rectified signal to the comparator means 23.

The comparator means 23 includes an amplifier in the form of an integrating circuit; the comparator means 23 at its output contains an error signal, being the difference between the input from the displacement pick-up 24, and the input signal which error signal in turn controls the drive means 29, which drive means positions the magnet 16.

I wish it to be understood that I do not desire to be limited to the exact details of construction shown and described, for obvious modifications will occur to persons skilled in the art.

Having thus described the invention, what I claim as new and desire to be secured by Letters Patent is as follows:

1. A system for regulating the flow of a fluid in dependence of an input signal, comprising in combination:

a valve housing including a fluid-pressure expansible chamber and having an inlet for receiving a fluid from a main conduit, and an outlet for discharging the fluid, main valve means adjustably positionable between said inlet and said outlet defining an adjustable passage upstream of said outlet to control the rate of flow of the fluid discharged from said outlet, said main valve means including a first passage for transferring the fluid from the main conduit into said expansible chamber for closing said main valve means a cylinder substantially closed off from said valve housing, a piston valve means in driving connection with said main valve means and being movable within said cylinder in opposite valve closing and valve opening directions, said cylinder having a first opening disposed on one side of said piston valve means, and a second opening disposed on the other side of said piston valve means for fluid to pass therethrough, the fluid on said one side of said piston valve means exerting a first pressure on said one side, the fluid on the other side of the piston valve means exerting a second pressure on said other side, resilient means urging said piston valve means to close said main valve means for throttling the flow of fluid through said adjustable passage, fluid control means in communication with said main conduit and with said first and second openings of the cylinder comprising:

a fluid switch, having first and second active stations, and a neutral station, said fluid switch, when operative, occupying one of said active stations, and including a container, and a slider reciprocally slidable in said container along a predetermined direction, and along a direction opposite to said predetermined direction, said main conduit being connected to said first opening of said cylinder, said second opening of said cylinder being connected to a source of fluid, in said first active station, said main conduit being connected to said second opening of said cylinder, said first opening being connected to the source of fluid, in said second active station, fluid transmission to said first and second openings being blocked in said neutral station, magnetic means controlled by said input signal for exerting a force on said slider in dependence of said input signal, and means for transmitting any pressure differential between said first and second fluid pressures to said fluid switch so as to oppose the force of said magnetic means, whereby the fluid switch is changed from a corresponding one of said active stations to said neutral station upon said first pressure equalling said second pressure, so as to enable said piston valve means to expell the fluid from the expansible chamber through a second passage in said main valve means to control said main valve means to regulate the outflow of said fluid through said adjustable passage, the cross-section of of said passage being proportional to said input signal.

2. A system as claimed in claim 1, wherein said magnetic means exerting a force on said slider, and wherein said means for transmitting any pressure difference between said first and second fluid pressures to said fluid switch includes said resilient means, said resilient means being connected to said slider so as to exert a force thereon opposite to the force of said magnetic means, whereby a comparison of the forces exerted on said slider by said magnetic means and said resilient means takes place in said fluid switch.

3. A system as claimed in claims 1 or 2 wherein said resilient means is at least partially disposed in said cylinder.

4. A system as claimed in claim 1, wherein said means for transmitting any pressure difference between said first and second fluid pressures to said fluid change-over switch comprises:

position measuring means for measuring an actual position of said piston within said cylinder, comparator means for comparing a desired position of said piston with said actual position, and drive means connected to said comparator means for positioning said magnetic means in dependence of said input signal, whereby said piston assumes a steady-state position proportional to said input signal.

5. A system as claimed in claim 4, wherein said position measuring means includes an oscillator, said position measuring means measuring the actual position of said piston within said cylinder in a contactless manner.

6. A system as claimed in claim 4, wherein said position measuring means provides an indicating signal in the form of an alternating current signal indicative of the position of said piston.

7. A system as claimed in claim 6, wherein said position measuring means further includes rectifying means for rectifying said alternating current signal, and for feeding the rectified signal to said comparator means.

8. A system as claimed in claim 5, wherein said comparator means includes an amplifier.

9. A system as claimed in claim 8, wherein said amplifier is an integrated circuit.

* * * * *